US009929417B2

(12) United States Patent
Nakamura et al.

(10) Patent No.: US 9,929,417 B2
(45) Date of Patent: Mar. 27, 2018

(54) VALVE DEVICE

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Akio Nakamura, Okazaki (JP); Takuya Suzuki, Anjo (JP); Shusuke Inagi, Toyota (JP); Akira Yamashita, Toyota (JP); Masaaki Kondo, Owariasahi (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 14/878,580

(22) Filed: Oct. 8, 2015

(65) Prior Publication Data
US 2016/0104903 A1    Apr. 14, 2016

(30) Foreign Application Priority Data

Oct. 10, 2014    (JP) ................................. 2014-208788

(51) Int. Cl.
*H01M 8/04* (2016.01)
*H01M 8/04089* (2016.01)
(Continued)

(52) U.S. Cl.
CPC ........... *H01M 8/04104* (2013.01); *F16K 1/34* (2013.01); *F16K 15/02* (2013.01); *F16K 15/025* (2013.01);
(Continued)

(58) Field of Classification Search
CPC .. F16K 1/34; F16K 27/0209; H01M 8/04104; Y10T 137/88054; Y10T 137/87917; Y10T 137/7925
(Continued)

(56) References Cited

U.S. PATENT DOCUMENTS 3,565,100 A    2/1971    Pfleger
7,290,562 B2 *  11/2007  Kane ..................... F16K 15/026
                                                    137/538
(Continued)

FOREIGN PATENT DOCUMENTS

DE         20210540 U1   11/2003
JP         2011-089569 A  5/2011
WO    WO 2013183871 A1 * 12/2013   .............. F17C 13/04

OTHER PUBLICATIONS

Machine Translation of WO2013183871(A1)—Fluid Control Valve Assembly, from Espacenet on Jul. 31, 2017.*
(Continued)

*Primary Examiner* — Mary McManmon
*Assistant Examiner* — Nicole Gardner
(74) *Attorney, Agent, or Firm* — Oliff PLC

(57) ABSTRACT

A valve device includes a body, a solenoid valve accommodated in an accommodation hole of the body, and a joint member fixed to the body. The solenoid valve includes: a sleeve having a tubular shape and fitted in the accommodation hole, and including an introduction passage and a delivery passage; and a valve element configured to open and close the passages. A U-seal is disposed between an outer wall surface of the sleeve and an inner wall surface of the accommodation hole. The body has an attachment hole that is located downstream of the delivery passage of the sleeve and opens on an outer surface of the body. The joint member including a backflow reduction valve is fixed to the attachment hole.

4 Claims, 5 Drawing Sheets

(51) Int. Cl.
  *F16K 39/02* (2006.01)
  *F16K 15/02* (2006.01)
  *F16K 27/02* (2006.01)
  *F16K 31/06* (2006.01)
  *F16K 1/34* (2006.01)
  *H01M 8/04082* (2016.01)

(52) U.S. Cl.
  CPC ........ *F16K 27/029* (2013.01); *F16K 27/0209* (2013.01); *F16K 31/0655* (2013.01); *F16K 31/0693* (2013.01); *F16K 39/024* (2013.01); *H01M 8/04089* (2013.01); *H01M 8/04201* (2013.01); *H01M 2250/20* (2013.01); *Y02T 90/32* (2013.01)

(58) Field of Classification Search
  USPC .......... 137/614.2, 613, 538; 251/129.15, 325
  See application file for complete search history.

(56) References Cited

U.S. PATENT DOCUMENTS

| | | |
|---|---|---|
| 2006/0104843 A1 | 5/2006 | Inoue |
| 2012/0199775 A1 | 8/2012 | Watanabe |
| 2015/0184805 A1* | 7/2015 | Lee .................... F17C 13/04 137/544 |

OTHER PUBLICATIONS

Jan. 19, 2016 Extended Search Report issued in European Search Report 15189054.8.

\* cited by examiner

F I G . 1
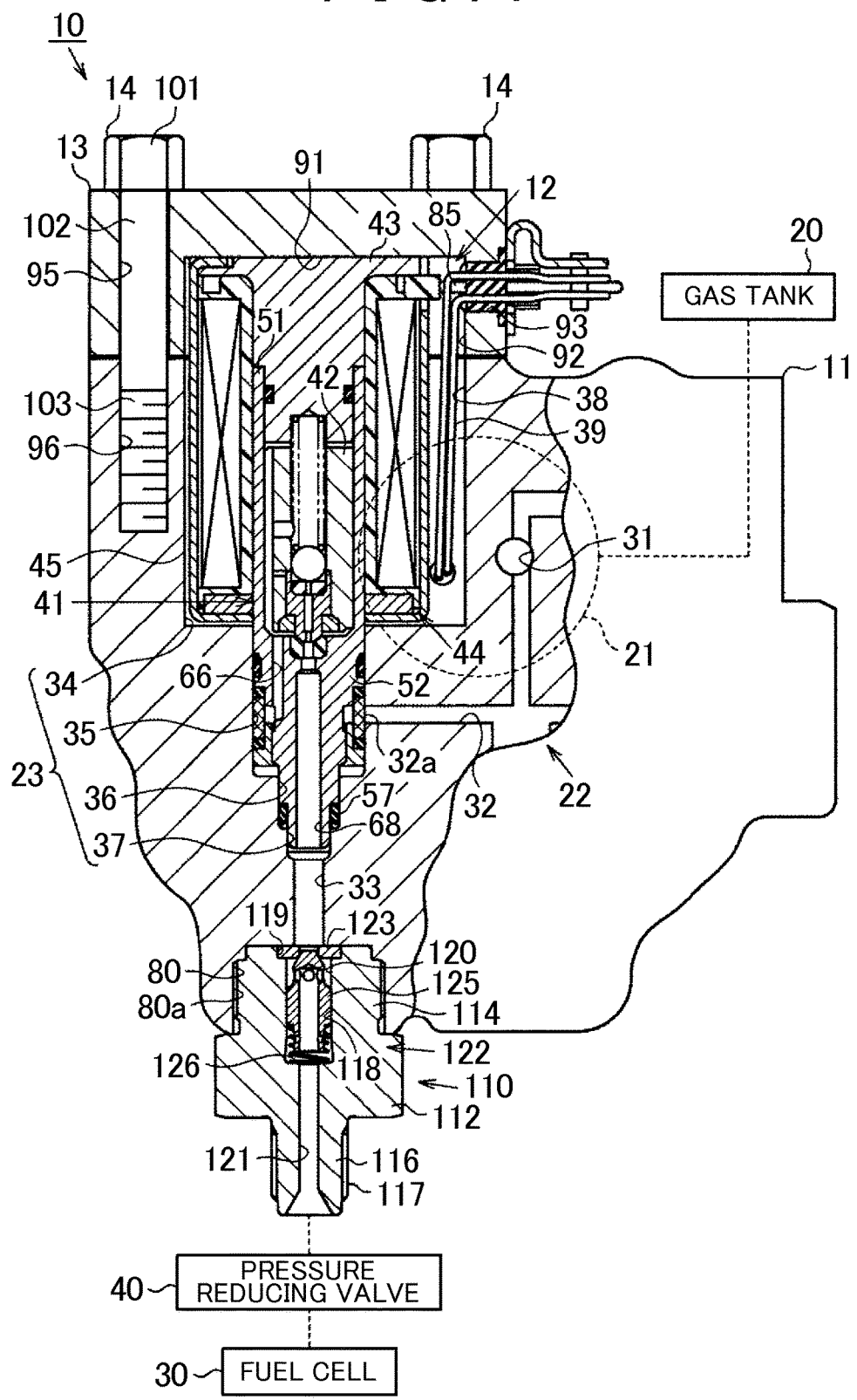

VALVE DEVICE

INCORPORATION BY REFERENCE

The disclosure of Japanese Patent Application No. 2014-208788 filed on Oct. 10, 2014 including the specification, drawings and abstract is incorporated herein by reference in its entirety.

BACKGROUND OF THE INVENTION

1. Field of the Invention

The invention relates to a valve device.

2. Description of Related Art

Fuel cell vehicles are provided with a valve device configured to control the supply of hydrogen gas from a gas tank to a fuel cell and to control the interruption of the supply of the hydrogen gas from the gas tank to the fuel cell. Examples of such a valve device include a valve device described in Japanese Patent Application Publication No. 2011-89569 (JP 2011-89569 A). The valve device described in JP 2011-89569 A includes a body having a supply passage communicated with a gas tank, and a solenoid valve accommodated in the body. The solenoid valve includes: a tubular sleeve having a flow passage communicated with the supply passage of the body; an opening-closing portion that opens and closes the flow passage in the sleeve; and a driving portion that drives the opening-closing portion to open or close the flow passage. A downstream-side opening of the flow passage in the sleeve is located inside the body. An outlet passage that extends from the opening of the sleeve to an outer surface of the body is formed in the body. With this configuration, the high-pressure hydrogen gas in the gas tank is introduced into the solenoid valve through the supply passage of the body. Then, the gas that has passed through the opening-closing portion of the solenoid valve flows through the flow passage of the sleeve and the outlet passage of the body. The gas is then delivered from an opening of the outer surface of the body to be supplied to a fuel cell. Seal members are disposed between an outer wall surface of the sleeve and an inner wall surface of the body. The seal members prevent the gas in the supply passage from flowing into the outlet passage through a clearance between the sleeve of the solenoid valve and the body.

In the valve device described in JP 2011-89569 A, the gas pressure in the supply passage of the body is usually higher than the gas pressure in the outlet passage of the body. Thus, a pressure (positive pressure) corresponding to the differential pressure is applied to the seal members. However, a pressure that is not a positive pressure may be applied to the seal members, due to the fluctuations of the gas pressure in the outlet passage. Examples of a pressure that is not a positive pressure include a pressure (counter pressure) that is generated, for example, when the gas pressure in the outlet passage becomes higher than the gas pressure in the supply passage. If such a counter pressure is applied to the seal members, a heavy load is placed on the seal members. This may be a factor of reduction in the useful life of the seal members, and may cause damages to components of the solenoid valve.

SUMMARY OF THE INVENTION

The invention provides a valve device configured to reduce a load to be placed on a seal member disposed between a sleeve of a solenoid valve and a body of the valve device and to prevent possible damages to components of the solenoid valve.

A valve device according to an aspect of the invention includes: a body having a gas passage and an accommodation hole communicated with the gas passage; a solenoid valve accommodated in the accommodation hole; and a joint member fixed to the body. The solenoid valve includes: a sleeve having a tubular shape and fitted in the accommodation hole, the sleeve including a passage communicated with the gas passage, an opening-closing portion configured to open and close the passage; and a driving portion configured to drive the opening-closing portion to open and close the passage. A seal member is disposed between an outer wall surface of the sleeve and an inner wall surface of the accommodation hole. The body has a joint connection opening that is located downstream of the passage of the sleeve, the joint connection opening being opened on an outer surface of the body. The joint member is fixedly attached to the joint connection opening. The joint member has a communication passage connected to the passage of the sleeve. The joint member includes a backflow reduction valve configured to hinder movement of gas in the communication passage toward the sleeve.

According to the above aspect, when a counter pressure is applied to the communication passage of the joint member, the backflow reduction valve of the joint member hinders the movement of gas in the communication passage toward the sleeve. This makes it possible to prevent application of the counter pressure to the components of the solenoid valve and the seal member disposed between the outer wall surface of the sleeve and the inner wall surface of the accommodation hole.

In the above aspect, the backflow reduction valve may include: a valve seat disposed in a valve seat attachment portion of a valve accommodation hole provided upstream of the communication passage of the joint member, the valve seat being in contact with the body; a valve element accommodated in the valve accommodation hole, the valve element being configured to be brought into contact with or moved away from the valve seat; and an urging member configured to urge the valve element toward an upstream side, the urging member being configured to cause the valve element to come into contact with the valve seat when a counter pressure is generated on a downstream side.

According to the above aspect of the invention, it is possible to reduce a load to be placed on the seal member disposed between the sleeve of the solenoid valve and the body of the valve device and to prevent possible damages to components of the solenoid valve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a partially cutaway view illustrating the planar configuration of a valve device according to an embodiment of the invention;

DETAILED DESCRIPTION OF EMBODIMENTS

Figure 2:
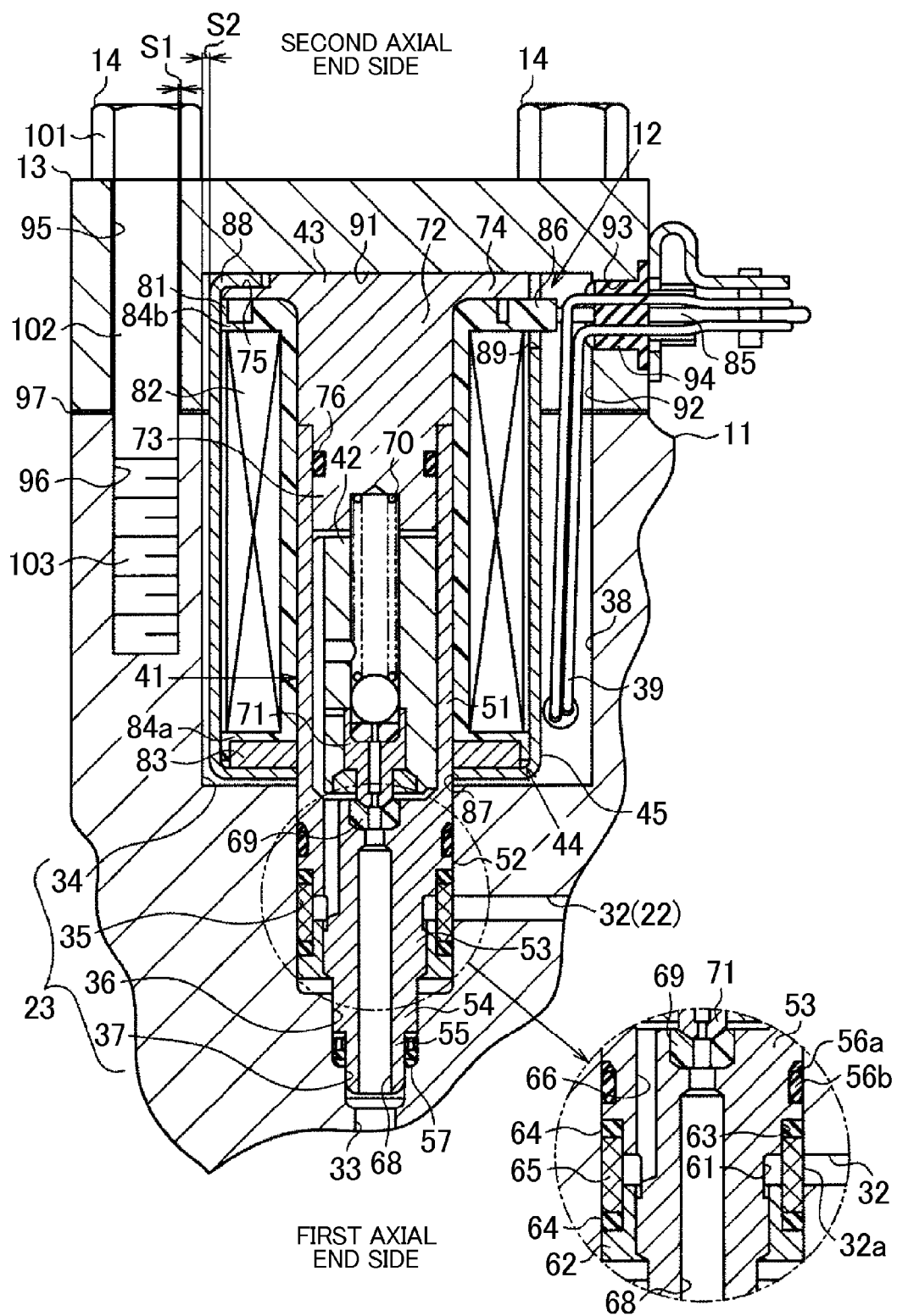
FIG. 2 is a sectional view of a solenoid valve and its surrounding structure.

Hereinafter, a valve device according to an embodiment of the invention will be described with reference to FIG. 1 to FIG. 4. A valve device 10 in FIG. 1 is attached to a gas tank 20, and is configured to control the supply of hydrogen gas from the gas tank 20 to a fuel cell 30 mounted in a vehicle. Hydrogen gas at high pressure (e.g. approximately 70 MPa) is stored in the gas tank 20.

As illustrated in FIG. 1, the valve device 10 includes a body 11, a solenoid valve 12, a cover 13, and a joint member 110. The solenoid valve 12 is a valve mechanism assembled to the body 11. A part of the solenoid valve 12 is covered with the cover 13. The joint member 110 is attached to the body 11. The cover 13 is fastened to the body 11 with fitting bolts 14, so that the solenoid valve 12 is assembled to the body 11. In addition to the solenoid valve 12 and the joint member 110, various valve mechanisms, such as a manual valve, and joints other than the joint member 110 are assembled to the body 11. For convenience of description, illustration of these mechanisms and joints is omitted, and the solenoid valve 12 and the joint member 110 are illustrated.

First, the configuration of the body 11 will be described. The body 11 has a flat rectangular box shape. Assuming that the surface of the body 11, which can be seen on the sheet on which FIG. 1 is drawn, is an upper surface, a lower surface of the body 11 is provided with a columnar attachment portion that is inserted into an attachment hole (not illustrated) of the gas tank 20. The body 11 in the present embodiment is made of a metal material, such as a wrought aluminum alloy. The body 11 has a gas passage 22 and an accommodation hole 23. The gas passage 22 provides communication between the inside and outside of the gas tank 20 when the body 11 has been attached to the gas tank 20. The accommodation hole 23 is communicated with the gas passage 22.

As illustrated in FIG. 1, the gas passage 22 has a connection passage 31, a supply passage 32, and an outlet passage 33. The connection passage 31 passes through the attachment portion 21 and is connected to the inside of the gas tank 20. The supply passage 32 is communicated with the connection passage 31 and opens on an inner wall surface of the accommodation hole 23. One end of the outlet passage 33 opens on a bottom surface (deepest portion) of the accommodation hole 23, and the other end of the outlet passage 33 opens on a side surface of the body 11. The outlet passage 33 is connected to the fuel cell 30, to which the hydrogen gas is supplied, via a pressure reducing valve 40.

The accommodation hole 23 is a circular hole with steps. The accommodation hole 23 has an outer-hole portion 34, a large-hole portion 35, a medium-hole portion 36, and a small-hole portion 37. The outer-hole portion 34 opens on a side surface of the body 11. The large-hole portion 35 opens on a bottom surface of the outer-hole portion 34. The medium-hole portion 36 opens on a bottom surface of the large-hole portion 35. The small-hole portion 37 opens on a bottom surface of the medium-hole portion 36. The outer-hole portion 34, the large-hole portion 35, the medium-hole portion 36, and the small-hole portion 37 are reduced in inner diameter in the stated order, and are located coaxially with one another. An inner wall surface of the outer-hole portion 34 has an extension groove 38 that extends in its axial direction (up-down direction in FIG. 1). Connection wires 39 for, for example, a temperature sensor (not illustrated) disposed in the gas tank 20 are pulled out from a side surface of the extension groove 38. One end of the supply passage 32 opens on an inner wall surface of the large-hole portion 35. One end of the outlet passage 33 is open at a bottom surface of the small-hole portion 37.

Next, the configuration of the solenoid valve 12 will be described. As illustrated in FIG. 2, the solenoid valve 12 includes a sleeve 41, a movable core 42, a stationary core 43, a solenoid 44, and a case 45 that covers the solenoid 44. In the following description, the deepest side (small-hole portion 37 side) of the accommodation hole 23 will be referred to as "first axial end side", and the opposite side of the accommodation hole 23 from the first axial end side will be referred to as "second axial end side".

As illustrated in FIG. 2, the sleeve 41 has a tubular portion 51 in a bottomed cylinder shape, and a bottom portion 52 that is integral with the tubular portion 51. The tubular portion 51 has an outer diameter and an inner diameter that are substantially uniform along its axial direction. The bottom portion 52 has a stepped shape, and the outer diameter of the bottom portion 52 is decreased in a stepwise manner toward the first axial end side. The bottom portion 52 has a large-diameter portion 53, a medium-diameter portion 54, and a small-diameter portion 55. The outer diameter of the large-diameter portion 53 is set substantially equal to the inner diameter of the large-hole portion 35. The outer diameter of the medium-diameter portion 54 is set substantially equal to the inner diameter of the medium-hole portion 36. The outer diameter of the small-diameter portion 55 is set substantially equal to the inner diameter of the small-hole portion 37. The sleeve 41 is accommodated in the accommodation hole 23 in a state where the small-diameter portion 55, the medium-diameter portion 54, and the large-diameter portion 53 are fitted respectively in the small-hole portion 37, the medium-hole portion 36, and the large-hole portion 35.

Figure 5:
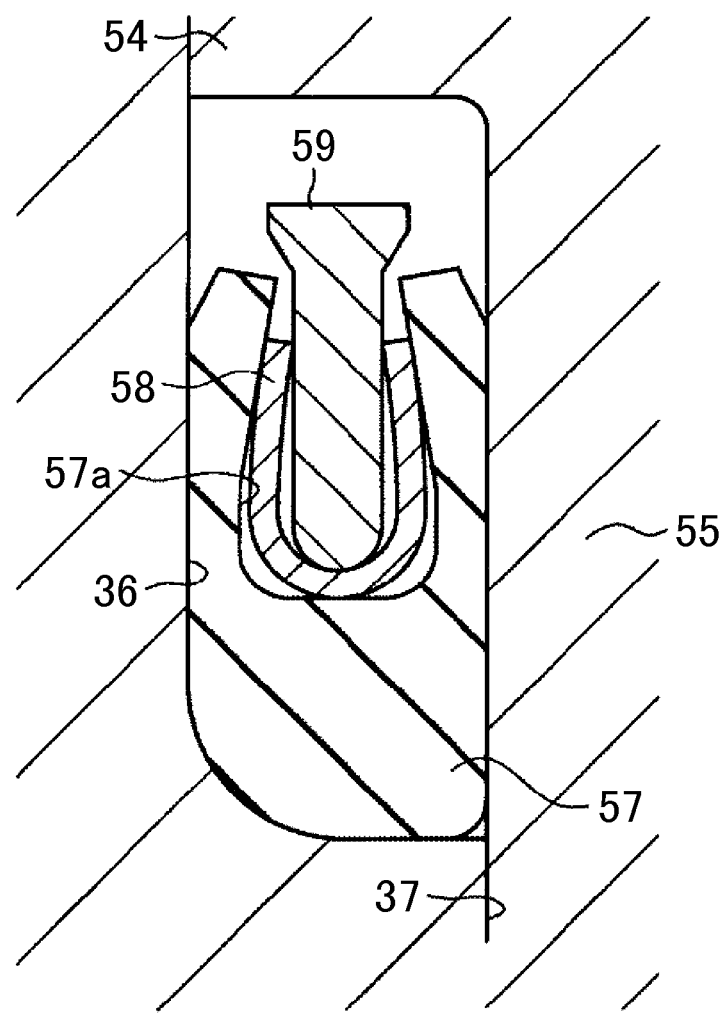
FIG. 5 is a sectional view of a U-seal.

A backup ring 56a and an O-ring 56b are disposed between the large-diameter portion 53 and the large-hole portion 35. Further, as illustrated in FIG. 5, a U-seal 57, which is an example of a seal member in the invention, is disposed between the small-diameter portion 55 and the medium-hole portion 36. The U-seal 57 keeps the valve device 10 airtight. The U-seal 57 seals the clearance between an outer wall surface of the sleeve 41 and an inner wall surface of the small-hole portion 37 of the accommodation hole 23.

An outer wall surface of the large-diameter portion 53 has a communication groove 61 having an annular shape and extending in the circumferential direction. The communication groove 61 is located at a position that faces an opening position 32a of the supply passage 32 formed in the inner wall surface of the large-hole portion 35. A groove-forming member 62 having an annular shape is fixed, through press-fitting, on the first axial end side of the communication groove 61. A shallow groove 63 is located on the second axial end side of the communication groove 61. The shallow groove 63 is smaller in depth in the radial direction than the communication groove 61. The shallow groove 63 extends along the entire circumference of the large-diameter portion 53. A filter 65, having a metallic mesh form, is disposed radially outward of the communication groove 61, at a position between the shallow groove 63 and the groove-forming member 62. The filter 65 is held between seal members 64. The bottom portion 52 has an introduction passage 66 that provides communication between the communication groove 61 and the inside (valve chamber) of the tubular portion 51. The introduction passage 66 extends linearly along the axial direction of the sleeve 41, and located at a position offset from the center of the bottom portion 52.

The bottom portion 52 has a delivery passage 68 that provides communication between the inside of the tubular portion 51 and the outlet passage 33. The delivery passage 68 extends linearly along the axial direction of the sleeve 41, and located at the center of the bottom portion 52. A valve seat 69 having an annular shape is fixed at an opening end of the introduction passage 66 on the second axial end side (the tubular portion 51 side). The introduction passage 66 and the delivery passage 68 are located inside the solenoid valve 12. Each of the introduction passage 66 and the delivery passage 68 is an example of a passage leading to the gas passage 22.

The movable core 42 has a columnar shape, and the outer diameter of the movable core 42 is set substantially equal to the inner diameter of the tubular portion 51 of the sleeve 41. The movable core 42 is accommodated in the tubular portion 51 so as to be movable in the axial direction. The movable core 42 is provided with a valve element 71 that comes into contact with or moves away from the valve seat 69 to close or open the delivery passage 68. The valve element 71 is movable along with the movable core 42 in the axial direction. A known pilot mechanism is incorporated in the movable core 42 in the present embodiment. The pilot mechanism allows a small amount of hydrogen gas to flow between the inside of the tubular portion 51 and the delivery passage 68 before the valve element 71 moves away from the valve seat 69 as the movable core 42 moves in the axial direction. The valve element 71 is an example of an opening-closing portion in the invention.

As illustrated in FIG. 2, the stationary core 43 has a columnar shape with steps. The stationary core 43 has a base portion 72, a press-fitted portion 73, and a flange portion 74. The press-fitted portion 73 extends from the base portion 72 toward the first axial end side. The flange portion 74 extends radially outward from a second axial end-side portion of the base portion 72. The outer diameter of the press-fitted portion 73 is set substantially equal to the inner diameter of the tubular portion 51 of the sleeve 41. The outer diameter of the base portion 72 is set substantially equal to the outer diameter of the tubular portion 51. The flange portion 74 has multiple (three, in the present embodiment) positioning grooves 75 that open on the outer peripheral side and the second axial end-side. The positioning grooves 75 are located at substantially equal intervals in the circumferential direction. The press-fitted portion 73 is press-fitted into the tubular portion 51, so that the stationary core 43 is fixed to the sleeve 41. An O-ring 76 is disposed between the press-fitted portion 73 and the tubular portion 51. As illustrated in FIG. 2, a coil spring 70 is disposed between the press-fitted portion 73 and the movable core 42. The movable core 42 is urged toward the first axial end side by the coil spring 70.

The solenoid 44 includes a bobbin 81 having a cylindrical shape, a coil 82 disposed on an outer periphery of the bobbin 81, and a yoke 83 having an annular shape. The inner diameter of the bobbin 81 is set substantially equal to each of the outer diameter of the tubular portion 51 of the sleeve 41 and the outer diameter of the base portion 72 of the stationary core 43. The length of the bobbin 81 (solenoid 44) along the axial direction is set longer than the depth of the outer-hole portion 34 (the length of the outer-hole portion 34 in the axial direction). The bobbin 81 has flange portions 84a, 84b. The flange portions 84a, 84b extend radially outward, and are located at the opposite axial ends of the bobbin 81. The outer diameter of the flange portions 84a, 84b is set substantially equal to the outer diameter of the flange portion 74 of the stationary core 43. A terminal portion 86 protrudes radially outward from the flange portion 84b located at the second axial end side. A connection wire 85 extending from the coil 82 comes out of the terminal portion 86. The bobbin 81 is fitted over the outer periphery of the tubular portion 51 of the sleeve 41 and the outer periphery of the base portion 72 of the stationary core 43. The inner diameter of the yoke 83 is set substantially equal to the outer diameter of the tubular portion 51. The outer diameter of the yoke 83 is set slightly smaller than the outer diameter of the flange portions 84a, 84b. The yoke 83 is fitted on the outer periphery of the tubular portion 51 so as to be adjacent to the flange portion 84a located on the first axial end side.

Figure 4:
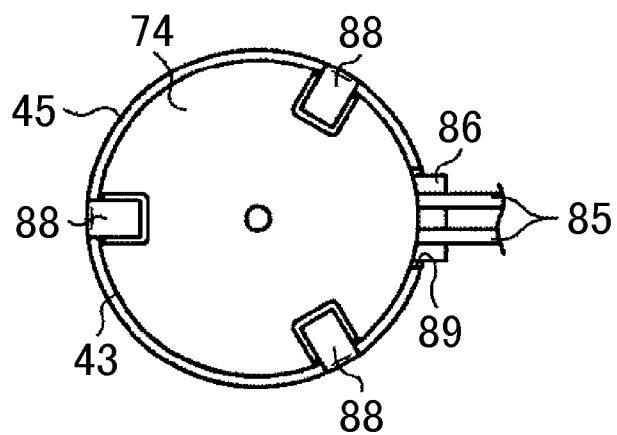
FIG. 4 is an end view of the solenoid valve as viewed from a second axial end side.

The case 45 has a bottomed cylinder shape, and has an outer diameter and an inner diameter that are substantially uniform along its axial direction. The inner diameter of the case 45 is set substantially equal to the outer diameter of the flange portions 84a, 84b of the bobbin 81. The outer diameter of the case 45 is set smaller than the inner diameter of the outer-hole portion 34. A through-hole 87 having a diameter substantially equal to the outer diameter of the tubular portion 51 is provided in a bottom portion of the case 45. As illustrated in FIG. 2 and FIG. 4, multiple (three, in the present embodiment) lugs 88 extending in the axial direction are provided at an opening end of the case 45. The lugs 88 are located at substantially equal intervals in the circumferential direction. One cutout 89 is formed at the opening end of the case 45, at the middle position between two of the three lugs 88. The case 45 is fitted on the outer periphery of the solenoid 44 with the terminal portion 86 projected from the cutouts 89. The lugs 88 are bent at their intermediate positions, and engaged in the positioning grooves 75 of the stationary core 43.

The solenoid valve 12 is assembled to the body 11 such that the second axial end-side portions of the stationary core 43, the solenoid 44, and the case 45 are projected from the accommodation hole 23 and the position of the connection wire 85 (terminal portion 86) in the circumferential direction substantially coincides with the opening position 32a of the supply passage 32. The solenoid 44 is an example of a driving portion in the invention.

Next, the configuration of the cover 13 will be described. As illustrated in FIG. 2, the cover 13 has a generally cup-shape, and is made of a metal material, such as a wrought aluminum alloy. The cover 13 has a recessed portion 91 in the form of a circular hole. The recessed portion 91 opens toward the first axial end side (the accommodation hole 23 side). The inner diameter of the recessed portion 91 is set substantially equal to the inner diameter of the outer-hole portion 34. The depth of the recessed portion 91 is set substantially equal to the axial length of a portion of the solenoid valve 12 that projects from the accommodation hole 23. An inner wall surface of the recessed portion 91 has an extension groove 92 that extends in the axial direction and opens toward the first axial end side. The extension groove 92 is located at a position that faces the extension groove 38 of the outer-hole portion 34. An outlet hole 93 that passes through the cover 13 in the radial direction is formed in a bottom surface of the extension groove 92. The connection wire 85 for the solenoid 44 and the connection wires 39 for the aforementioned sensors come out of the outlet hole 93 with a grommet 94 disposed on the inner wall surface of the outlet hole 93.

The cover 13 has multiple through-holes 95 that pass through the cover 13 in the axial direction. The through-holes 95 are located around the recessed portion 91 at equal intervals in the circumferential direction. The body 11 has multiple threaded holes 96. The threaded holes 96 are located around the accommodation hole 23, at positions that face the through-holes 95. The fitting bolts 14 loosely passed through the through-holes 95 are screwed into the threaded holes 96, so that the cover 13 is fastened to the body 11. A gasket 97 having an annular shape is held between the cover 13 and the body 11.

Each fitting bolt 14 has a head 101, a shank 102 having a columnar shape, and a thread 103. The shank 102 extends from the head 101 toward the first axial end side. The thread 103 extends from the shank 102 toward the first axial end side. The thread 103 of each fitting bolt 14 is screwed into the threaded hole 96 with the shank 102 disposed in the through-hole 95. The head 101, the shank 102 and the thread 103 are reduced in outer diameter in the stated order. The outer diameter of the shank 102 is set slightly smaller than the diameter of the through-hole 95, and the shank 102 is loosely fitted in the through-hole 95. More specifically, the outer diameter of the shank 102 is set such that a clearance S1 between the shank 102 and a wall surface of the through-hole 95 in the direction perpendicular to the axial direction is smaller than a clearance S2 between the recessed portion 91 of the cover 13 and the solenoid valve 12 (case 45) in the direction perpendicular to the axial direction.

In the solenoid valve 12, when the coil 82 is de-energized, the movable core 42 is urged toward the valve seat 69 by the urging force of the coil spring 70 and the pressure of the hydrogen gas. Then, when the valve element 71 is seated on the valve seat 69, the delivery passage 68 is closed. In this state, the hydrogen gas supplied from the supply passage 32 reaches the tubular portion 51 through the communication groove 61, but is not supplied to the outlet passage 33. On the other hand, when the coil is energized, the movable core 42 is attracted to the stationary core 43, and moves in a direction away from the valve seat 69 against the urging force of the coil spring 70. When the valve element 71 moves away from the valve seat 69, the delivery passage 68 is opened. In this state, the hydrogen gas supplied from the supply passage 32 reaches the tubular portion 51 through the communication groove 61 and the introduction passage 66, and is then supplied to the outlet passage 33 through the delivery passage 68 to be supplied to the fuel cell 30.

Figure 3:
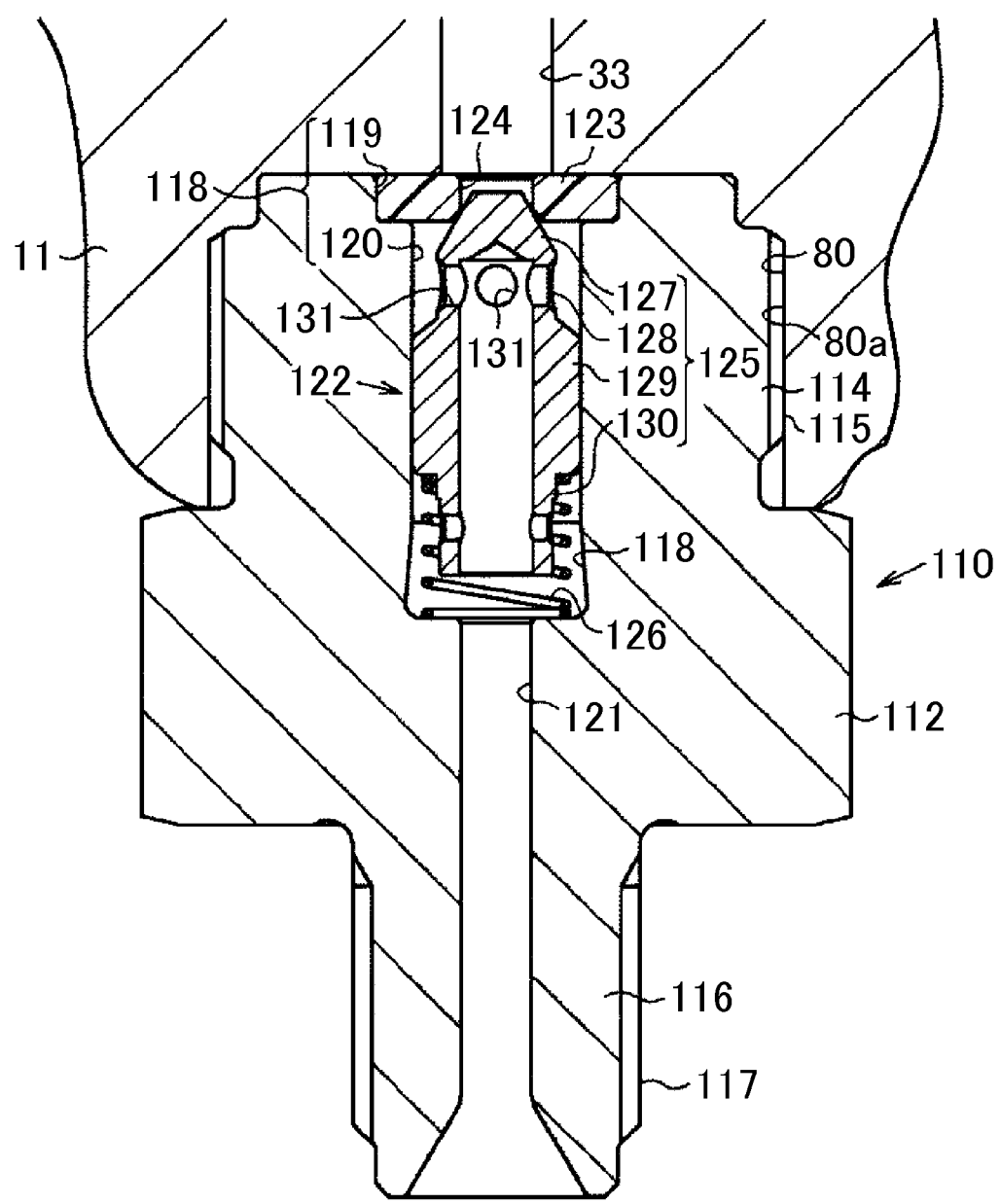
FIG. 3 is a sectional view of a joint member.

As illustrated in FIG. 1 and FIG. 3, an attachment hole 80 is formed in the outer surface of the body 11. The attachment hole 80 is located coaxially with the outlet passage 33 and communicated with the outlet passage 33. The diameter of the attachment hole 80 is set larger than the diameter of the outlet passage 33, and an internal thread 80a is formed in an inner wall surface of the attachment hole 80. The attachment hole 80 is an example of a joint connection opening in the invention.

As illustrated in FIG. 3, the joint member 110 has a holding portion 112, a body-side connecting portion 114, and a pipe-side connecting portion 116. The body-side connecting portion 114 has a generally cylindrical shape and extends from the holding portion 112 toward the first axial end-side of the body 11. The pipe-side connecting portion 116 has a generally cylindrical shape and extends from the holding portion 112 in a direction away from the body-side connecting portion 114. An outer peripheral surface of the holding portion 112 is partially chamfered such that a section thereof perpendicular to the axial direction is generally hexagonal. Thus, the holding portion 112 can be held by, for example, a tool.

When an external thread 115 on an outer peripheral surface of the body-side connecting portion 114 is screwed to an internal thread 80a on an inner wall surface of the attachment hole 80, the joint member 110 is detachably fixed to the body 11. An external thread 117 is formed on an outer peripheral surface of the pipe-side connecting portion 116, and one end of an outlet pipe (not illustrated) connected to the pressure reducing valve 40 is screwed to the external thread 117. In the joint member 110, a valve accommodation hole 118 is formed in the body-side connecting portion 114 and part of the holding portion 112, and a communication passage 121 is formed in the remaining portion of the holding portion 112 and the pipe-side connecting portion 116. The valve accommodation hole 118 is larger in diameter than the communication passage 121. When the external thread 115 is screwed to the internal thread 80a on the inner wall surface of the attachment hole 80 and thus the joint member 110 is attached to the body 11, the communication passage 121 is located coaxially with the outlet passage 33 of the body 11.

The valve accommodation hole 118 has a larger-diameter portion 119 and a valve accommodation portion 120. The larger-diameter portion 119 is formed in an end surface of the body-side connecting portion 114. The valve accommodation portion 120 is smaller in diameter than the larger-diameter portion 119, and is located adjacent to the larger-diameter portion 119. The larger-diameter portion 119 is an example of a valve seat attachment portion in the invention. The valve accommodation portion 120 functions as a valve chamber in which a backflow reduction valve 122 is accommodated. An anodic oxide coating is applied to an inner wall surface of the valve accommodation portion 120.

The backflow reduction valve 122 includes a valve seat (seat) 123, a valve element 125, and a coil spring 126. The valve seat 123 is press-fitted in the larger-diameter portion 119. The valve element 125 moves in a direction in which the valve element 125 approaches or moves away from the valve seat 123 in the valve accommodation portion 120 to close or open a valve orifice 124 of the valve seat 123. The coil spring 126 urges the valve element 125 toward the valve seat 123. In the present embodiment, the valve element 125 is a poppet. The coil spring 126 is an example of an urging member. The valve seat 123 is made of a hard resin material, such as a polyimide resin. In the present embodiment, for example, Vespel® (DuPont) is used as a polyimide resin.

As illustrated in FIG. 3, the valve element 125 is a generally cylindrical member made of stainless steel. The valve element 125 has a closure portion 127, a small-diameter tubular portion 128, a large-diameter tubular portion 129, and a support portion 130 that are arranged from the valve seat 123 side in the stated order. The closure portion 127 closes an end portion of the valve element 125 on the valve seat-123 side. An outer peripheral surface of the closure portion 127 is tapered. The small-diameter tubular portion 128 has an outer diameter smaller than the inner diameter of the valve accommodation portion 120. The inside and outside of the small-diameter tubular portion 128 are communicated with each other through a plurality of lateral grooves 131. The large-diameter tubular portion 129 slides with respect to the inner wall surface of the valve accommodation portion 120. The outer diameter of the large-diameter tubular portion 129 is set substantially equal to the inner diameter of the valve accommodation portion 120. The support portion 130 has an outer diameter that is smaller than the outer diameter of the large-diameter tubular portion 129.

The coil spring 126 is accommodated in a compressed state, together with the valve element 125, in the valve accommodation portion 120 with one end of the coil spring 126 on the valve seat 123-side attached to the support portion 130 of the valve element 125. Thus, the valve element 125 is urged toward the valve seat 123 by the coil spring 126.

In the present embodiment, the spring constant of the coil spring 126 need not be set to a value at which a backflow of hydrogen gas is completely blocked when the valve element 125 closes the valve orifice 124, but needs to be set to a value at which a backflow of hydrogen gas with a high flow rate is prevented when the valve element 125 closes the valve orifice 124. The spring constant of the coil spring 126 is set as described above for the following reason.

If the spring constant of the coil spring 126 is set to a high value to completely block a backflow of hydrogen gas using the valve element 125 when the valve element 125 closes the valve orifice 124, the urging force of the coil spring 126 is too strong when the valve element 125 opens the valve orifice 124 to allow the passage of hydrogen gas. Thus, the valve opening amount of the valve element 125 may be reduced. For this reason, the spring constant of the coil spring 126 is not set to a value at which a backflow of hydrogen gas is completely blocked when the valve element 125 closes the valve orifice 124, so that a required valve opening amount of the valve element 125 is ensured. As a result, in the present embodiment, even when the valve element 125 closes the valve orifice 124, the valve element 125 does not completely close the valve orifice 124, so that a slight backflow of hydrogen gas is allowed.

The valve element 125 that is urged by the coil spring 126 closes the valve orifice 124 when a tapered tip end of the closure portion 127 is inserted into the valve orifice 124 and seated on the valve seat 123.

The valve seat 123 is fitted in the larger-diameter portion 119, and the valve seat 123 is held between the body 11 and the joint member 110 attached to the body 11. In this way, the valve seat 123 is fixedly press-fitted to the joint member 110. When the valve seat 123 is held between the body 11 and the joint member 110, the outer surface of the body 11, more specifically, a portion of the outer surface of the body 11 around the opening end of the outlet passage 33, is brought into close contact with the valve seat 123, and the valve seat 123 and the joint member 110 are brought into close contact with each other. As a result, a space between the body 11 and the joint member 110 is air-tightly sealed by the valve seat 123. This enhances the sealing performance.

When the solenoid 44 (coil 82) is de-energized and thus the solenoid valve 12 is closed, the hydrogen gas is not delivered from the outlet passage 33 and the valve element 125 of the backflow reduction valve 122 is urged by the pressure of the hydrogen gas in the communication passage 121 and the urging force of the coil spring 126 to be seated on the valve seat 123. Thus, the valve orifice 124 of the valve seat 123 is closed, so that a backflow of hydrogen gas from the pressure reducing valve 40 is prevented. On the other hand, when the solenoid 44 (coil 82) is energized and thus the solenoid valve 12 is opened, the valve element 125 of the backflow reduction valve 122 moves away from the valve seat 123 by the pressure supplied from the outlet passage 33 to open the valve orifice 124. Thus, the hydrogen gas passed through the valve orifice 124 flows into the valve accommodation hole 118, flows through the valve element 125 along the lateral grooves 131, and delivered toward the pressure reducing valve 40 through the communication passage 121.

Next, the operation of the present embodiment will be described. In the valve device 10 described above, the gas pressure at a position downstream of the joint member 110 may be higher than the pressure of the gas delivered from the solenoid valve 12-side, depending on how the fuel cell 30 and the pressure reducing valve 40 are used. In this case, when a counter pressure is applied to the communication passage 121 of the joint member 110, the valve element 125 (backflow reduction valve 122) hinders the movement of hydrogen gas in the communication passage 121 toward the sleeve 41. This makes it possible to prevent application of a counter pressure to the components of the solenoid valve 12 and the U-seal 57 disposed between the outer wall surface of the sleeve 41 and the inner wall surface of the accommodation hole 23.

The present embodiment has the following features.

1) The valve device 10 according to the present embodiment has the body 11, the solenoid valve 12, and the joint member 110. The accommodation hole 23 of the body 11 provides communication between the gas passage 22 and the accommodation hole 23 communicated with the gas passage 22. The solenoid valve 12 is accommodated in the accommodation hole 23. The joint member 110 is fixed to the body 11. The solenoid valve 12 has the introduction passage 66 communicated with the gas passage 22 and the delivery passage 68. The solenoid valve 12 includes the sleeve 41 having a tubular shape and fitted in the accommodation hole 23, the valve element 71 that opens and closes the introduction passage 66 and the delivery passage 68, and the solenoid 44 that drives the valve element 71 to open and close the introduction passage 66 and the delivery passage 68. The U-seal 57 is disposed between the outer wall surface of the sleeve 41 and the inner wall surface of the accommodation hole 23. The body 11 has the attachment hole 80 that is located downstream of the delivery passage 68 of the sleeve 41 and that opens on the outer surface of the body 11. The joint member 110 is fixedly attached to the attachment hole 80, and has the communication passage 121 connected to the outlet passage 33 of the sleeve 41. Further, the joint member 110 includes the backflow reduction valve 122 that hinders the movement of hydrogen gas in the communication passage 121 toward the sleeve 41. According to the present embodiment, the load to be placed on the seal member disposed between the sleeve of the solenoid valve and the body of the valve device is reduced and possible damages to the components of the solenoid valve are prevented.

Instead of providing the joint member 110 with the backflow reduction valve 122, the body 11 may be provided with the backflow reduction valve 122. In this case, configurations corresponding to the outlet passage 33, the valve accommodation portion 120 of the backflow reduction valve 122 and the larger-diameter portion 119 are formed in the body 11 with a drill. However, in this case, the depths of the bores are increased. Thus, the dimensional accuracy of the bores, and the assembling accuracy of the valve element 125, the valve seat 123, and the coil spring 126 may be reduced.

In the present embodiment, the depths of the valve accommodation portion 120 and the larger-diameter portion 119 of the joint member 110, which are achieved through boring, are shorter than those in the case where the bores are formed in the body 11. Thus, the dimensional accuracy of the bores, and the assembly accuracy of the valve element 125, the valve seat 123 and the coil spring 126 are not reduced. Further, it is necessary to just perforate a conventional joint member without the valve accommodation portion 120 and the larger-diameter portion 119, in order to form the valve accommodation portion 120 and the larger-diameter portion 119.

2) The backflow reduction valve 122 includes the valve seat 123 and the valve element 125. The valve seat 123 is disposed in the larger-diameter portion 119 of the valve accommodation hole 118 located upstream of the communication passage 121 of the joint member 110, and the valve seat 123 is brought into contact with the body 11. The valve element 125 is accommodated in the valve accommodation hole 118, and is brought into contact with or moved away from the valve seat 123. The backflow reduction valve 122 urges the valve element 125 toward the upstream side. The backflow reduction valve 122 has the coil spring 126 that urges the valve element 125 toward the upstream side and that causes the valve element 125 to come into contact with the valve seat 123 when a counter pressure is generated on the downstream side.

With this configuration, the valve seat 123 contacts the body 11, that is, the valve seat 123 is disposed between the body 11 and the joint member 110, the outer surface of the body 11 and the valve seat 123 are brought into close contact with each other, and the valve seat 123 and the joint member 110 are brought into contact with each other. As a result, the space between the body 11 and the joint member 110 is air-tightly sealed by the valve seat 123. Thus, the space between the body 11 and the joint member 110 is sealed by the valve seat 123. As a result, it is not necessary to dispose an additional seal member between the body 11 and the joint member 110. This reduces the number of seal members.

3) In the present embodiment, the spring constant of the coil spring 126 that applies an urging force to the backflow reduction valve 122 is set to a value at which a backflow of hydrogen gas with a high flow rate is prevented. As a result, when the valve is opened to allow the passage of hydrogen gas, the required valve opening amount of the valve element 125 is ensured.

The invention should not be limited to the foregoing embodiment, and the embodiment may be modified as follows. In the foregoing embodiment, the U-seal 57 as a seal member is disposed between the small-diameter portion 55 and the small-hole portion 37. However, an O-ring as a seal member may be disposed together with a backup ring between the small-diameter portion 55 and the small-hole portion 37.

In the present embodiment, an O-ring 56 is disposed together with the backup ring 56a between the large-diameter portion 53 and the large-hole portion 35. However, a U-seal may be disposed between the large-diameter portion 53 and the large-hole portion 35. When the U-seal is used, an endless (ring-shaped) plate spring 58 and a deformation prevention ring 59 may be fitted in the groove 57a between lips of the U-seal 57 as illustrated in FIG. 5.

The backflow reduction valve 122 should not be limited to a backflow reduction valve of a poppet type, and may be another type of backflow reduction valve.

With this configuration described so far, the space between the body and the joint member can be sealed by the valve seat. Thus, it is not necessary to provide an additional seal member between the body and the joint member, thereby reducing the number of seal members.

The invention claimed is:

1. A valve device comprising:
a body having a gas passage and an accommodation hole communicated with the gas passage;
a solenoid valve accommodated in the accommodation hole; and
a joint member detachably fixed to the body, wherein the solenoid valve includes:
  a sleeve having a tubular shape and fitted in the accommodation hole, the sleeve including a passage communicated with the gas passage,
  an opening-closing portion configured to open and close the passage; and
  a driving portion configured to drive the opening-closing portion to open and close the passage,
a seal member is disposed between an outer wall surface of the sleeve and an inner wall surface of the accommodation hole,
the body has a joint connection opening that is located downstream of the passage of the sleeve, the joint connection opening being opened on an outer surface of the body and being configured to receive the joint member,
the joint member is detachably fixed to the joint connection opening,
the joint member has a communication passage connected to the passage of the sleeve,
the joint member includes a backflow reduction valve configured to hinder movement of gas in the communication passage toward the sleeve,
a valve seat of the backflow reduction valve is held in air-tight contact with the outer surface of the body and the joint member, and
the valve seat of the backflow reduction valve air-tightly seals a space between the body and the joint member.

2. The valve device according to claim 1, wherein the valve seat is disposed in a valve seat attachment portion of a valve accommodation hole provided at an upstream end of the communication passage of the joint member, and
the backflow reduction valve includes:
  a valve element accommodated in the valve accommodation hole, the valve element being configured to be brought into contact with or moved away from the valve seat; and
  an urging member configured to urge the valve element toward an upstream side, the urging member being configured to cause the valve element to come into contact with the valve seat when a counter pressure is generated on a downstream side.

3. The valve device according to claim 1, wherein the accommodation hole is coaxially aligned with a valve accommodation hole that accommodates the backflow reduction valve.

4. The valve device according to claim 1, wherein the solenoid valve is coaxially aligned with the backflow reduction valve.

* * * * *